(12) United States Patent
Jacob (Yaakov) et al.

(10) Patent No.: US 10,409,605 B2
(45) Date of Patent: *Sep. 10, 2019

(54) SYSTEM AND METHOD FOR USING A BRANCH MIS-PREDICTION BUFFER

(71) Applicant: Ceva D.S.P. Ltd., Herzlia Pituach (IL)

(72) Inventors: Jeffrey Allan (Alon) Jacob (Yaakov), Raanana (IL); Michael Boukaya, Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,408

(22) Filed: Jan. 23, 2018

(65) Prior Publication Data

US 2018/0210735 A1 Jul. 26, 2018

Related U.S. Application Data

(63) Continuation of application No. 12/611,937, filed on Nov. 4, 2009, now Pat. No. 9,952,869.

(51) Int. Cl.
 *G06F 9/38* (2018.01)
(52) U.S. Cl.
 CPC ............ *G06F 9/3804* (2013.01); *G06F 9/381* (2013.01); *G06F 9/3806* (2013.01); *G06F 9/3808* (2013.01); *G06F 9/3861* (2013.01)

(58) Field of Classification Search
 CPC .................................................... G06F 9/3808
 See application file for complete search history.

(56) References Cited

U.S. PATENT DOCUMENTS

| | | | |
|---|---|---|---|
| 3,940,741 | A | 2/1976 | Horikoshi et al. |
| 4,725,947 | A | 2/1988 | Shoni et al. |
| 5,734,881 | A | 3/1998 | White et al. |
| 5,850,542 | A | 12/1998 | Schroter et al. |
| 5,961,637 | A | 10/1999 | Sturges et al. |
| 7,197,630 | B1 | 3/2007 | Alsup et al. |
| 7,620,804 | B2 | 11/2009 | Kuo |
| 7,836,287 | B2 | 11/2010 | Doing et al. |
| 2002/0087852 | A1 | 7/2002 | Jourdan et al. |
| 2003/0023838 | A1 | 1/2003 | Karim et al. |
| 2003/0135722 | A1 | 7/2003 | Johnson |
| 2008/0086621 | A1 | 4/2008 | Ogura |

FOREIGN PATENT DOCUMENTS

| | | |
|---|---|---|
| JP | 01-106141 | 4/1989 |
| WO | WO 99/04335 | 1/1999 |

*Primary Examiner* — Jacob Petranek
(74) *Attorney, Agent, or Firm* — Pearl Cohen Zedek Latzer Baratz LLP

(57) ABSTRACT

A system and method is provided for executing a conditional branch instruction. The system and method may include a branch predictor to predict one or more instructions that depend on the conditional branch instruction and a branch mis-prediction buffer to store correct instructions that were not predicted by the branch predictor during a branch mis-prediction.

16 Claims, 8 Drawing Sheets

FIG. 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | BRANCH A,B | | 101 | IF1 | IF2 | D1 | D2 | D3 | D4 | E1 | E2 | E3 | E4 | | | | | | | | | |
| 2 | ds1 | | 102 | | IF1 | IF2 | D1 | D2 | D3 | D4 | E1 | E2 | E3 | E4 | | | | | | | | |
| 3 | ds2 | | 103 | | | IF1 | IF2 | D1 | D2 | D3 | D4 | E1 | E2 | E3 | E4 | | | | | | | |
| 4 | ds3 | | 104 | | | | IF1 | {IF2 / IF1} | IF2 | D1 | D2→D2 | D3 | D4 | E1 | E2 | E3 | E4 | | | | | |
| 5 | A | | 301 | | | | | | IF1 | IF2 | D1 | D2→D2 | D3 | D4 | E1 | E2 | E3 | E4 | | | | |
| 6 | A+1 | | 302 | | | | | | | IF1 | IF2 | D1 | D2→D2 | D3 | D4 | E1 | E2 | E3 | E4 | | | |
| 7 | A+2 | | 303 | | | | | | | | IF1 | IF2 | D1 | D2 | D3 | D4 | E1 | E2 | E3 | E4 | | |
| 8 | B+3 | | 304 | | | | | | | | | IF1 | IF2 | D1 | D2 | D3 | D4 | E1 | E2 | E3 | E4 | |
| 9 | B+4 | | 305 | | | | | | | | | | IF1 | IF2 | D1 | D2 | D3 | D4 | E1 | E2 | E3 | E4 |
| 10 | B+5 | | 306 | | | | | | | | | | | IF1 | IF2 | D1 | D2 | D3 | D4 | E1 | E2 | E3 | E4 |
| 11 | | | | | | | | | | | | | | | | | | | | | | |
| 12 | | | | | | | | | | | | | | | | | | | | | | |
| 13 | pc (D1 stage) | | | | | 101 | 102 | 103 | 104 | 201 | 202 | 203 | 304 | 305 | 306 | | | | | | | |
| 14 | Decoder input | | | | | BRANCH | ds1 | ds2 | ds3 | B | B+1 | B+2 | B+3 | B+4 | B+5 | | | | | | | |
| 15 | tag address | | | | | | | tag B | | | | | | | | | | | | | | |
| 16 | tag hit/miss | | | | | | | HIT | | | | | | | | | | | | | | |
| 17 | cache index | | | | | | | | index B | index B+1 | index B+2 | | | | | | | | | | | |
| 18 | cache write data | | | | | | | | xxx | xxx | xxx | | | | | | | | | | | |
| 19 | cache read data | | | | | | | | instr B | instr B+1 | instr B+2 | | | | | | | | | | | |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | BRANCH A,B | 101 | 101 | IF1 | IF2 | D1 | D2 | D3 | D4 | E1 | E2 | E3 | E4 | | | |
| 2 | ds1 | 102 | 102 | | IF1 | IF2 | D1 | D2 | D3 | D4 | E1 | E2 | E3 | E4 | | |
| 3 | ds2 | 103 | 103 | | | IF1 | IF2 | D1 | D2 | D3 | D4 | E1 | E2 | E3 | E4 | |
| 4 | ds3 | 104 | 104 | | | | IF1 | IF2 | D1 | D2 | D3 | D4 | E1 | E2 | E3 | E4 |
| 5 | A | 201 | Killed | | | | | IF1 | IF2 | D̶2̶ Killed | | | | | | |
| 6 | A+1 | 202 | Killed | | | | | | IF1 | D̶3̶ I̶F̶2̶ Killed | | | | | | |
| 7 | A+2 | 203 | Killed | | | | | | | D̶4̶ I̶F̶1̶ Killed | | | | | | |
| 8 | B | 301 | 301 | | | | | | | | IF1 | IF2 | D1 | D2 | D3 | D4 |
| 9 | B+1 | 302 | 302 | | | | | | | | | IF1 | IF2 | D1 | D2 | D3 |
| 10 | B+2 | 303 | 303 | | | | | | | | | | IF1 | IF2 | D1 | D2 |
| 11 | B+3 | 304 | 304 | | | | | | | | | | | IF1 | IF2 | D1 |
| 12 | B+4 | 305 | 305 | | | | | | | | | | | | IF1 | IF2 |
| 13 | B+5 | 306 | 306 | | | | | | | | | | | | | IF1 |
| 14 | | | | | | | | | | | | | | | | |
| 15 | pc (D1 stage) | | | | | 101 | 102 | 103 | 104 | 201 | 202 | 203 | 301 | 302 | 303 | 304 |
| 16 | Decoder input | | | | | | BRANCH | ds1 | ds2 | ds3 | Killed | Killed | Killed | B | B+1 | B+2 |
| 17 | tag address | | | | | | | tag B | | | | | tag B | | | |
| 18 | tag hit/miss | | | | | | | MISS | | | | | | | | |
| 19 | cache index | | | | | | | | | | | | index B | index B+1 | index B+2 | |
| 20 | cache write data | | | | | | | | | | | | instr B | instr B+1 | instr B+2 | |
| 21 | cache read data | | | | | | | | | | | | | xxx | xxx | xxx |

FIG. 3

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | | (pc D1 stage) | (Decoder address) | | | | | | | | | | | |
| 1 | brloop_write 6 II.... | 100 | 100 | IF2 | D1 | D2 | D3 | E1 | E2 | E3 | E4 | | | |
| 2 | nop | 101 | 101 | IF1 | IF2 | D1 | D2 | D3 | E1 | E2 | E3 | E4 | | |
| 3 | A1 | 102 | 102 | | IF1 | IF2 | D1 | D2 | D3 | E1 | E2 | E3 | E4 | |
| 4 | A2 | 103 | 103 | | | IF1 | IF2 | D1 | D2 | D3 | E1 | E2 | E3 | E4 |
| 5 | A3 | 104 | 104 | | | | IF1 | IF2 | D1 | D2 | D3 | E1 | E2 | E3 |
| 6 | A4: brloop{nt}lc2,A1 | 105 | 105 | | | | | IF1 | IF2 | D1 | D2 | D3 | E1 | E2 |
| 7 | A5:ds1 | 106 | 106 | | | | | | IF1 | IF2 | D1 | D2 | D3 | E1 |
| 8 | A6:ds2 | 107 | 107 | | | | | | | IF1 | IF2 | D1 | D2 | D3 |
| 9 | NI | | 102 | | | | | | | | IF1 | IF2 | | D2→D2 |
| 10 | NI+1 | | 103 | | | | | | | | | IF1 | | |
| 11 | Iteration 2 | | 104 | | | | | | | | | | | |
| 12 | | | 105 | | | | | | | | | | | |
| 13 | | | 106 | | | | | | | | | | | |
| 14 | | | 107 | | | | | | | | | | | |
| 15 | | | 102 | | | | | | | | | | | |
| 16 | | | 103 | | | | | | | | | | | |
| 17 | Iteration 3 | | 104 | | | | | | | | | | | |
| 18 | | | 105 | | | | | | | | | | | |
| 19 | | | 106 | | | | | | | | | | | |
| 20 | | | 107 | | | | | | | | | | | |
| 21 | NI | | 108 | | | | | | | | | | | |
| 22 | NI+1 | | 109 | | | | | | | | | | | |

| # | Signal | | | | | | | | | |
|---|---|---|---|---|---|---|---|---|---|---|
| 23 | NI+2 | 100 | | | | | | | | |
| 24 | pc(D1 stage) | | 101 | 102 | 103 | 104 | 105 | 106 | 107 | |
| 25 | Decoder Input | | brloop_write | nop | A1 | A2 | A3 | A4 | A5 | A6 | A1 |
| 26 | tag address | | | tag A1 | | | | | tag A5 | tag A1 | |
| 27 | tag write data | | | write tag | | | | | write tag | | |
| 28 | tag compare, hit/miss | | | | | | | | | HIT index1, bufreg/ | |
| 29 | cache index | | | | index1 | index2 | index3 | index4 | index5 | index1 | index2 | index3 |
| 30 | cache write data | | | | A1 | A2 | A3 | A4 | A5 | A6 | A1 | A2 |
| 31 | cache read data | | | | | | | | | | | |
| 32 | pflush | | | | | | | | | | | |
| 33 | plf1_valid | | | | 1 | 1 | 1 | 1 | 1 | 1 | 1 | |
| 34 | plf2_valid | | | | | | | | | invalid | invalid | invalid |
| 35 | pd1_valid | | | | | | | | | invalid | invalid | invalid |
| 36 | pd2_valid | | | | | | | | | | invalid | |
| 37 | pdls_int_r | | | | | | | | | | 1 | |
| 38 | pseq_pc | 100 | 101 | 102 | 103 | 104 | 105 | 106 | 107 | 108 | |
| 39 | pd1d2pc_lmp_r | 100 | 101 | 102 | 103 | 104 | 105 | 106 | 107 | 108 | |
| 40 | pd1d2pc | | | 102 | 103 | 104 | 105 | 106 | 107 | Killed | |
| 41 | PD1D2PC_R | | | | 102 | 103 | 104 | 105 | 106 | 107 | 103 | |
| 42 | bmb_pseq_pc | | | | | | | | | 102 | | |
| 43 | PTADDR_R | | | | | | | | | | | |
| 44 | bmb_pd1d2pc | | | | | | | | | | | |
| 45 | BMB_PD1D2PC_R | | | | | | | | | 102 | 102 | |
| 46 | pc2pc_out | | 101 | 102 | 103 | 104 | 105 | 106 | 107 | 102 | |
| 47 | PD2D3PC_R | | 100 | 101 | 102 | 103 | 104 | 105 | 106 | 107 | |

|    | 15 | 16 | 17 | 18 | 19 | 20 | 21 | 22 | 23 | 24 | 25 | 26 | 27 | 28 | 29 | 30 | 31 | 32 | 33 |
|----|----|----|----|----|----|----|----|----|----|----|----|----|----|----|----|----|----|----|----|
| 1  |    |    |    |    |    |    |    |    |    |    |    |    |    |    |    |    |    |    |    |
| 2  |    |    |    |    |    |    |    |    |    |    |    |    |    |    |    |    |    |    |    |
| 3  |    |    |    |    |    |    |    |    |    |    |    |    |    |    |    |    |    |    |    |
| 4  |    |    |    |    |    |    |    |    |    |    |    |    |    |    |    |    |    |    |    |
| 5  | E4 |    |    |    |    |    |    |    |    |    |    |    |    |    |    |    |    |    |    |
| 6  | E3 | E4 |    |    |    |    |    |    |    |    |    |    |    |    |    |    |    |    |    |
| 7  | E2 | E3 | E4 |    |    |    |    |    |    |    |    |    |    |    |    |    |    |    |    |
| 8  | E1 | E2 | E3 | E4 |    |    |    |    |    |    |    |    |    |    |    |    |    |    |    |
| 9  | D3 | E1 | E2 | E3 | E4 |    |    |    |    |    |    |    |    |    |    |    |    |    |    |
| 10 | D2→D2 | D3 | E1 | E2 | E3 | E4 |    |    |    |    |    |    |    |    |    |    |    |    |    |
| 11 |    | D2 | D3 | E1 | E2 | E3 | E4 |    |    |    |    |    |    |    |    |    |    |    |    |
| 12 |    |    | D2 | D3 | E1 | E2 | E3 | E4 |    |    |    |    |    |    |    |    |    |    |    |
| 13 |    |    |    | D2 | D3 | E1 | E2 | E3 | E4 |    |    |    |    |    |    |    |    |    |    |
| 14 |    |    |    |    | D2 | D3 | E1 | E2 | E3 | E4 |    |    |    |    |    |    |    |    |    |
| 15 |    |    |    |    |    | D2 | D3 | E1 | E2 | E3 | E4 |    |    |    |    |    |    |    |    |
| 16 |    |    |    |    |    |    | D2 | D3 | E1 | E2 | E3 | E4 |    |    |    |    |    |    |    |
| 17 |    |    |    |    |    |    |    | D2 | D3 | E1 | E2 | E3 | E4 |    |    |    |    |    |    |
| 18 |    |    |    |    |    |    |    |    | D2 | D3 | E1 | E2 | E3 | E4 |    |    |    |    |    |
| 19 |    |    |    |    |    |    |    |    |    | D2 | D3 | E1 | E2 | E3 | E4 |    |    |    |    |
| 20 |    |    |    |    |    |    |    |    |    |    | D2 | D3 | E1 | E2 | E3 | E4 |    |    |    |
| 21 |    |    |    |    | D1 |    |    |    |    |    | D1 | D2 | D3 | E1 | E2 | E3 | E4 |    |    |
| 22 |    |    |    |    | IF2|    |    |    |    |    | IF2| D1 | D2 | D3 | E1 | E2 | E3 | E4 |    |

| | A2 | A3 | A4 | A5 | A6 | A1 | A2 | A3 | A4 | A5 | IF1 | IF2 | D1 | D2 | D3 | E1 | E2 | E3 | E4 |
|---|---|---|---|---|---|---|---|---|---|---|---|---|---|---|---|---|---|---|---|
| 23 | | | | | | IF1 | | | | | | | | | | | | | |
| 24 | | | | | | | | | | | | | | | | | | | |
| 25 | A2 | A3 | A4 | A5 | A6 | A1 | A2 | A3 | A4 | A5 | A6 | NI | NI+1 | NI+2 | | | | | |
| 26 | | tag A5 | | tag A1 | | | | tag A5 | | tag A1 | | | | | | | | | |
| 27 | | HIT | | HIT | | | | | | | | | | | | | | | |
| 28 | | | | | | | | | | HIT | | | | | | | | | |
| 29 | index4 | index5 | index_buffreg | index1 | index2 | index3 | index4 | indextex.buf | index1 | index2 | | | | | | | | | |
| 30 | | | | | | | | | | | | | | | | | | | |
| 31 | A3 | A4 | A5 | A6 | A1 | A2 | A3 | A4 | A5 | A1 | | | | | | | | | |
| 32 | | | | | | | | | | | | | | | | | | | |
| 33 | invalid | invalid | invalid | invalid | invalid | invalid | invalid | invalid | invalid | invalid | | | | | | | | | |
| 34 | invalid | invalid | invalid | invalid | invalid | invalid | invalid | invalid | invalid | invalid | | | | | | | | | |
| 35 | invalid | invalid | invalid | invalid | invalid | invalid | invalid | invalid | invalid | invalid | | | | | | | | | |
| 36 | | | | | | | | | | | | | | | | | | | |
| 37 | 1 | 1 | 1 | 1 | 1 | 1 | 1 | 1 | 1 | 1 | | | | | | | | | |
| 38 | 108 | 108 | 108 | 108 | 108 | 108 | 108 | 108 | 108 | 108 | | | | | | | | | |
| 39 | | | | | | | | | | | | | | | | | | | |
| 40 | 108 | 108 | 108 | 108 | 108 | 108 | 108 | 108 | 108 | 108 | 108 | 109 | 110 | | | | | | |
| 41 | Killed | Killed | Killed | Killed | Killed | Killed | Killed | Killed | Killed | Killed | Killed | 109 | 110 | | | | | | |
| 42 | 104 | 105 | 106 | 107 | 108 | 103 | 104 | 105 | 106 | 107 | 108 | 109 | 110 | | | | | | |
| 43 | | | | 102 | | | | | | 102 | | | | | | | | | |
| 44 | 104 | 105 | 106 | 107 | 102 | 103 | 104 | 105 | 106 | 107 | 102 | 108 | 109 | 110 | | | | | |
| 45 | 103 | 104 | 105 | 106 | 107 | 102 | 103 | 104 | 105 | 106 | 107 | 108 | 109 | | | | | | |
| 46 | 103 | 104 | 105 | 106 | 107 | 102 | 103 | 104 | 105 | 106 | 107 | 108 | | | | | | | |
| 47 | 102 | 103 | 104 | 105 | 106 | 107 | 102 | 103 | 104 | 105 | 106 | 107 | | | | | | | |

SYSTEM AND METHOD FOR USING A BRANCH MIS-PREDICTION BUFFER

CROSS REFERENCE TO RELATED APPLICATIONS

This application is a continuation application of U.S. patent application Ser. No. 12/611,937, filed Nov. 4, 2009, which is hereby incorporated by reference.

BACKGROUND

Embodiments of the invention relate to methods and systems for predicting outcomes of branch instructions. In particular, embodiments of present invention relate to storing instructions from branch mis-predictions for use during subsequent branch mis-predictions.

A program may include a branch instruction at which, based on a branch condition, a process may proceed in one of multiple possible ways. For example, in a sequence of instructions, 1, 2, 3, 4, 5, where 5 is a branch instruction, instruction 5 may command the process to proceed sequentially to instructions 6, 7, 8, . . . or to jump ahead to instructions 100, 101, 102, . . . .

To avoid time delays, instructions are typically fetched from program memory ahead of time so that they are ready for use when they are needed in the processor pipeline. However, at a branch, the next instruction may be unknown until the branch instruction is executed. Therefore, subsequent instructions can not be fetched beforehand, thereby causing a time delay in the process pipeline.

To reduce such time delays, a branch predictor may be used to predict the outcome of a conditional branch. The predicted instructions at the branch are preemptively retrieved from program memory and temporarily stored in a program cache for easy access. A branch predictor may be static, using only the branch instructions themselves to determine the branch outcome or dynamic, also using historical statistics of the branch to determine the branch outcome.

However, branch predictors may perform poorly for some algorithms, e.g., predicting correctly at approximately 50% of branches and predicting incorrectly at approximately 50% of branches. Furthermore, some algorithms cannot benefit from dynamic branch prediction, e.g., when there is no correlation between a current branch decision and preceding branch decisions.

When a branch prediction is correct, the predicted instructions are immediately retrieved from the program cache. When the branch prediction is incorrect, the retrieved instructions are discarded and the processor must again retrieve the correct instructions from program memory using additional computational cycles. The additional computational cycles used to retrieve the correct instructions from program memory after a branch mis-prediction may be referred to as a branch mis-prediction penalty.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

FIG. 2 is a first table showing processor operations initiated by a branch instruction in accordance with embodiments of the invention;

FIG. 3 is a second table showing processor operations initiated by a branch instruction in accordance with embodiments of the invention;

FIG. 4A is an upper right quadrant of a third table showing processor operations initiated by a branch instruction in accordance with embodiments of the invention;

FIG. 4B is a lower right quadrant of the third table showing processor operations initiated by a branch instruction in accordance with embodiments of the invention;

FIG. 4C is an upper left quadrant of the third table showing processor operations initiated by a branch instruction in accordance with embodiments of the invention;

FIG. 4D is a lower left quadrant of the third table showing processor operations initiated by a branch instruction in accordance with embodiments of the invention.

Figure 1:
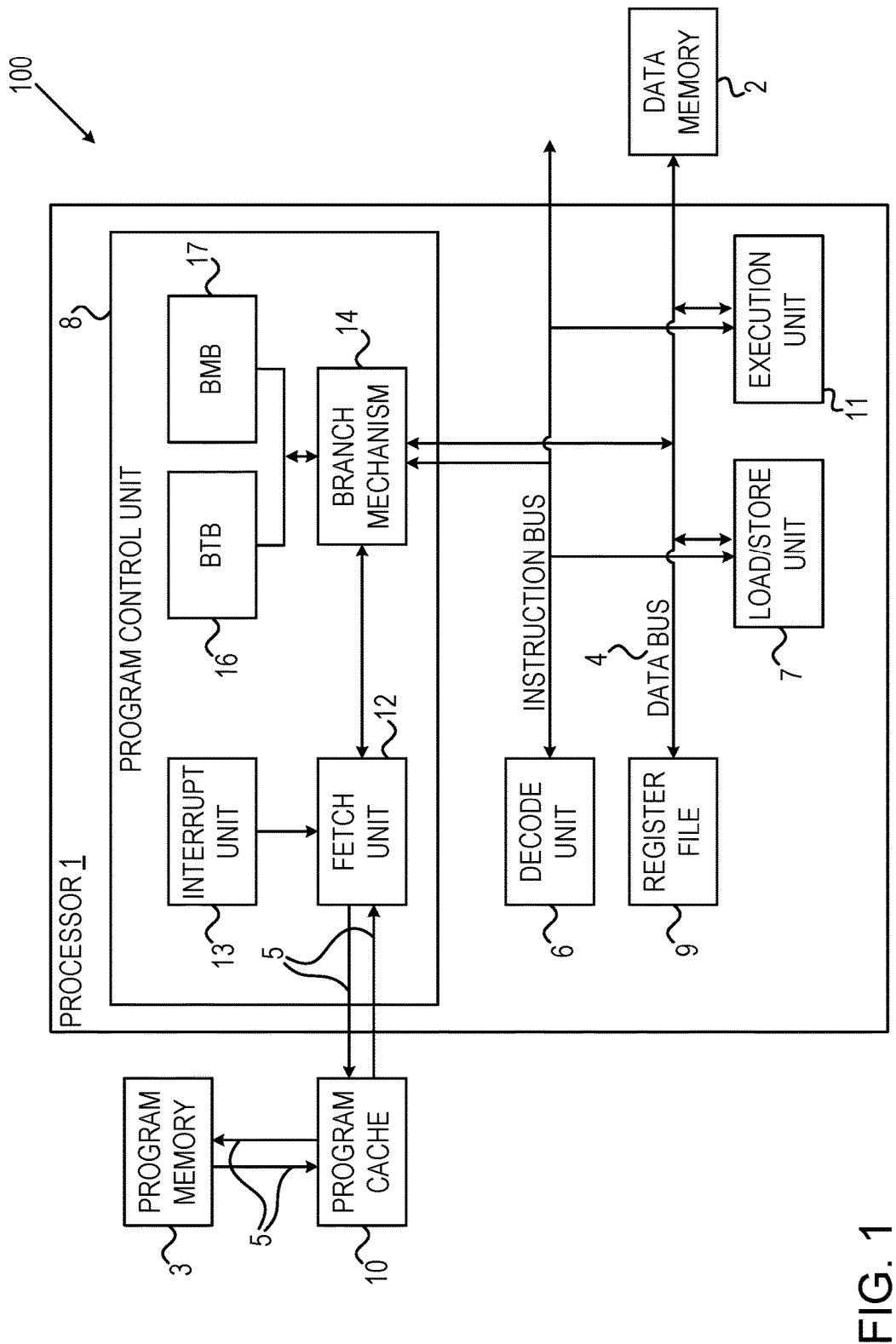
FIG. 1 is a schematic illustration of a system for in accordance with embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A branch instruction may refer to an instruction at which a process may proceed in one of multiple possible ways. Branch instructions may be conditional or unconditional. An unconditional branch instruction may be one in which the outcome is predetermined and subsequent instructions are known prior to processing the branch instruction. For example, an unconditional branch instruction may be to repeat an instruction loop a predetermined number of times and then jump to a latter instruction. A conditional branch instructions may be one in which the outcome is dependent on a condition. The condition is typically unknown before subsequent instructions are to be fetched. For example, in one scenario, the condition may only be known when the branch instruction is decoded.

When a branch instruction is encountered in a program, a processor may retrieve one or more instructions from a program memory that are predicted to follow the branch instruction. To retrieve instructions from the program memory, the processor may fetch the instructions, store them in a program cache, queue and dispatch the instructions. Then, to read the instructions, the processor may access a tag array, perform a tag compare, and access the program cache. This series of operations is typically extensive and power consuming. In conventional systems, when the branch prediction is incorrect and the wrong predicted instructions have been retrieved from the program memory, these instructions are discarded and the processor accesses the program memory again, repeating the extensive process to retrieve the correct instructions. Each time the branch prediction is incorrect, the processor may suffer a significant time delay and computational penalty, i.e., a mis-prediction penalty, in order to fetch the correct instruction from program memory.

In an embodiment of the invention, a system and method are provided for executing a conditional branch instruction. A branch predictor may predict one or more instructions. The predicted instructions may depend on the conditional branch instruction. A branch mis-prediction buffer may store correct instructions that were not predicted by the branch predictor during a branch mis-prediction.

In an embodiment of the invention, a system and method are provided for executing a conditional branch instruction. One or more correct instructions may be retrieved from a branch mis-prediction buffer during a branch mis-prediction. The branch mis-prediction buffer may store previously used instructions that were not predicted during a previous branch mis-prediction.

In an embodiment of the invention, a system and method are provided for storing instructions in a branch mis-prediction buffer. One or more predicted instructions that depend on a conditional branch instruction may be retrieved from program memory. A processor may determine that the one or more predicted instructions are incorrect. One or more correct instructions may be retrieved from program memory. The one or more correct instructions may be stored in the branch mis-prediction buffer.

Embodiments of the invention may include a local cache, e.g., a branch mis-prediction buffer (BMB), to store mis-predicted instructions. A mis-predicted instruction may refer to an instruction that, once the branch condition is known, is determined to be the correct instruction(s) succeeding the branch instruction, but which was not predicted by the branch predictor. During a mis-prediction, if the correct instruction is stored in the BMB, the instruction may be quickly retrieved from the BMB and not from program memory, resulting in a zero mis-prediction penalty. However, if the correct instruction is not stored in the BMB, the correct instruction may be retrieved from program memory and a mis-predict penalty may be incurred. However, according to embodiments of the invention, instead of discarding the mis-predicted instructions and wasting the computational effort used to fetch them, the mis-predicted instructions may be stored in the BMB for use during subsequent branches that may result in mis-predictions.

Reference is made to FIG. 1, which is a schematic illustration of a system according to embodiments of the invention. The system may include a device 100 having a processor 1, a data memory unit 2, a program memory unit 3, and a program cache 10.

Device 100 may include a computer device, cellular device, or any other digital device such as a cellular telephone, personal digital assistant (PDA), video game console, etc. Device 100 may include any device capable of executing a series of instructions to run a computer program.

Processor 1 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Processor 1 may be coupled to data memory unit 2 via a data bus 4 and to program memory unit 3 via a program memory bus 5.

Program memory unit 3 typically stores a set of instructions and rules for running a computer program while data memory unit 2 typically stores data generated while operating the program instructions such as pre-generated (i.e. static) data and/or scratch pad (i.e. dynamic) data; however, other arrangements for storing instructions and data in a memory or memories may be used.

Program cache 10 may provide temporary storage for program instructions retrieved from program memory unit 3 so that the instructions are more accessible for use by program control unit 8. Program memory unit 3 may be a long term memory unit, while program cache 10 may be a short term memory unit. Data memory unit 2, program memory unit 3 and program cache 10 may include, for example, random access memory (RAM), dynamic RAM (DRAM), flash memory, cache memory, volatile memory, non-volatile memory or other suitable memory units or storage units. Data memory unit 2, program memory unit 3, and program cache 10 may be implemented as separate or integrated memory units. Data memory unit 2, program cache 10 and/or program memory unit 3 may be integrated ("on-chip") or may be separate (i.e., "off-chip"). In one embodiment in which there is a multi-level memory or a memory hierarchy, program memory unit 3 may be off-chip and the program cache 10 and/or Data memory unit 2 may be on-chip, e.g., an L-1 cache (e.g., which may run at a different rate than the processor clock rate) or an L-2 cache (e.g., which is relatively more integrated than the L-1 cache and typically runs at the processor clock rate). Other or additional memory architectures may be used.

Processor 1 may include a program control unit 8. Program control unit 8 may request, retrieve, and dispatch instructions from program memory unit 3 and may be responsible, in general, for the program pipeline flow. Program control unit 8 may include a data memory controller (not shown) coupled to data memory bus 4, and a program memory controller (not shown) coupled to program memory bus 5 to retrieve data from data memory unit 2 and program memory unit 3, respectively.

Program control unit 8 may include a fetch unit 12, an interrupt unit 13, and a branch mechanism 14. Fetch unit 12 may retrieve or fetch program instructions from program memory unit 3 and save the instructions to program cache 10 until they are requested for use by program control unit 8. Fetch unit 12 may be used to fetch instructions to a local queue prior to dispatching the instructions. Branch mechanism 14 may detect branch instructions, predict the outcome of branch instructions, and based on the predicted outcome of branch instructions request subsequent instructions from program memory unit 3 via fetch unit 12. Interrupt unit 13 may interrupt a current process, e.g., to initiate another higher priority process.

Processor 1 may include a decode unit 6, a load/store unit 7, one or more register files 9, and an execution unit 11. Once instructions are dispatched by program control unit 8, decode unit 6 may decode the instructions. Processor 1 may use register files 9 to implement tags to efficiently access decoded instruction, e.g., in the same computational cycle as they are requested. Execution unit 11 may execute the instructions. Load/store unit 7 may perform load and store operations from/to data memory unit 2.

Processor 1 may execute, for example, the following sequential pipeline stages for each instruction:

IF1—program memory address (operated by program control unit 8)
IF2—program memory fetch (operated by fetch unit 12)
D1—instruction dispatch (operated by program control unit 8)
D2—instruction decode (operated by decode unit 6)
D3 to D4—register file read (using register files 9)
E1 to E4—execute, data memory access, and register file write-back (operated by execution unit 11, load/store unit 7, and register files 9).

Other or additional pipeline stages and operating device components may be used.

In a process comprising sequential instructions, instructions to be processed in future are known beforehand and fetch unit 12 may preemptively retrieve instructions so that each instruction is fetched before the processor is ready to dispatch the instruction. The fetched instructions are temporarily stored in program cache memory 10, and/or a local queue which is significantly faster to access than program memory 3.

However, instructions succeeding a conditional branch instruction may depend on a branch condition that is not yet known at the time the instructions are to be fetched. For example, the branch instruction may proceed to any of multiple different instructions or process paths depending on the outcome of the branch condition.

Branch mechanism 14 may identify whether or not an instruction is a branch instruction, for example, at the decode stage (D2) of processing the instruction. When an instruction is a branch instruction, if the correct one of multiple possible subsequent instructions is not known at the time when the instruction is to be retrieved, branch mechanism 14 may predict which instruction most likely succeeds the branch instruction. A branch target buffer (BTB) 16 may store data used to make the predictions. BTB 16 may be a buffer or temporary memory unit, which may be separate from, integrated with or part of program cache 10.

If the predicted branch instruction matches the actual branch instruction, the predicted instruction may be used and the branch mis-prediction penalty is zero.

However, if the predicted branch instruction does not match the actual branch instruction, the actual branch instruction may be fetched from program memory 3. Accordingly, each time branch mechanism 14 mis-predicts a branch outcome, the process may suffer a time delay and computational penalty of fetching the correct instruction from program memory 3, for example, 3 cycles (IF1 to D1). This time delay or number of cycles may vary for different processor 1 pipelines.

According to embodiments of the invention, once the correct instructions are retrieved from program memory 3 and used, instead of discarding the instructions and wasting the computational effort used to fetch them, the correct, though mis-predicted, branch instructions may be written, saved, and/or stored for later use in a branch mis-prediction buffer (BMB) 17. BMB 17 may accumulate correct branch instructions that were not predicted. Although the program incurs a one-time mis-prediction penalty to initially retrieve these instructions from program memory 3, by saving them for use during subsequent mis-predictions, the mis-prediction penalty for retrieving the same instructions may be avoided thereafter.

During the operation of the series of program instructions, in a first scenario, branch mechanism 14 predicts the correct instruction succeeding a branch instruction and the correct subsequent instructions has already been retrieved from program memory 3. The correct subsequent instruction may then be used. In this case, there is no mis-prediction and the mis-predict penalty is zero.

In a second scenario, branch mechanism 14 makes a mis-prediction and predicts the wrong instruction succeeding a branch instruction. Once the instruction succeeding a branch instruction is known, processor 1 may attempt to retrieve the instruction from BMB 17. Processor 1 may check if BMB 17 contains the mis-predicted instruction simultaneous to program control unit 8 fetching a new instruction from the program memory sub-system. Only later when the branch instruction is known does processor 1 select between the predicted and mis-predicted instruction. If the correct instruction was a mis-predicted instruction in a previous program branch, the instruction should already be stored in BMB 17. Accordingly, instead of retrieving the correct instructions from program memory 3, processor 1 may retrieve the correct instruction from BMB 17. Therefore, even for a branch mis-prediction, if the correct branch instruction was previously a correct mis-predicted instruction, the mis-predict penalty for retrieving instructions from program memory 3 may be zero. In contrast with the other methods, in which the mis-predict penalty is zero for correct predictions and non-zero (e.g., 3 computational cycles) for mis-predictions, according to embodiments of the invention, the mis-predict penalty is zero for both correct as well as incorrect branch predictions.

BMB 17 may store instructions that have been dispatched (at the D1 pipeline stage). Alternatively, instructions in BMB 17 may be stored in other stages of a pipeline process (e.g., IF2 or D2). BMB 17 may be relatively more accessible than program cache 10 because BMB 17 is typically smaller than program cache 10. BMB 17 may be physically integrated with branch mechanism 14.

Reference is made to FIGS. 2-4, which are tables showing processor operations initiated by a branch instruction according to embodiments of the invention.

In FIGS. 2-4, each row in the tables shows the processor pipeline stages for a single instruction. The instructions (listed in column 1) are ordered in sequential rows in the order in which they may be processed, i.e., in the order in which the instructions first enter the processor pipeline (in operation IF1). Each sequential column shows the operations executed on the instructions that occur in each sequential computational cycle. That is, once an instructions in each row first enter the processor pipeline, in each sequential column, the processor executes sequential operations on the instruction, e.g., program memory address (IF1), fetching (IF2), dispatching (D1), decoding (D2), register file read (D3 to D4), execute, data memory access, and register file write-back (E1 to E4). Other or additional operations may be used.

In FIG. 2, a branch predictor mis-predicts that branch instruction Branch A,B will branch to instruction A instead of the correct instruction B. That is, the branch condition of a conditional instruction Branch A,B does not match the static prediction for that condition. However, in the figure, the mis-predicted correct branch instruction B is stored in the BMB and therefore, there is no penalty for the branch mis-prediction.

The upper-right cell (row 1, column 1) in the table shows an instruction labeled "Branch A,B." The instruction Branch A,B may be an instruction in a sequence of instructions of a program. Instruction Branch A,B may be stored at a first address, e.g., denoted arbitrarily to be 101. Instruction Branch A,B may be a branch instruction, for example, providing instructions to proceed next to either instruction A or instruction B, but this is not known until the instruction is decoded (in operation D2). The next instruction following Branch A,B (e.g., after the three delay slots) may be determined by comparing the predicted and mis-predicted instructions and is typically only known after Branch A,B has completed pipeline stage E1. The example in the figure does not depend on a static prediction. As such, either of address A or B may be the next sequential address. Instruction A may be stored at a second address, e.g., denoted arbitrarily to be 201, and instruction B may be stored at a third address, e.g., denoted arbitrarily to be 301.

During the program process, instruction Branch A,B may enter the processor pipeline, e.g., in pipeline stage IF1 (row 1, column 4). In pipeline stage IF1, a processor may access a program memory address to locate instruction Branch A,B stored at address 101 in a program memory.

Instruction Branch A,B may proceed to the next sequential stages IF2 (row 1, column 5), D1 (row 1, column 6), and then D2 (row 1, column 7). In pipeline stage D2, a processor may decode instruction Branch A,B to detect that Branch A,B is a branch instruction. To detect a branch instruction in operation D2, e.g., 3 computational cycles may be used (IF1-D1). Delay slots (e.g., three slots, ds1, ds2, and ds3) may be used to delay the pipeline cycle until instruction Branch A,B is decoded.

A branch mechanism may determine that instruction Branch A,B is a branch instruction in operation D2 (row 1, column 7). A branch predictor predicts the branch to proceed to instruction A at address 201. Accordingly, instruction A may enter the processor pipeline, e.g., in pipeline stage IF1 (row 5, column 8) and may be fetched from program memory in the next pipeline stage IF2 (row 5, column 9).

While instruction A is accessed from program memory (row 5, column 8), the BMB may be simultaneously searched for non-predicted instruction B at address 301, e.g., by checking for a BMB cache tag matching the instruction B cache tag (row 15, column 8). In this scenario, address 301 (where instruction B resides) is found in the cache tag, and the tag compare asserts the hit flag (row 16, column 8). In one embodiment, the cache tag may be implemented in registers (e.g., not RAM) causing the hit flag to be available in the same computational cycle (corresponding to column 8). Since there is a hit in the cache (row 16, column 8), the BMB may proceed to extract instruction B data.

In the following computational cycle (corresponding to column 9), the cache address, corresponding to the tag where instruction B found a match, may be applied to the BMB. In the next cycle, instruction B may be retrieved from the BMB (row 19, column 10). Instructions may be stored in the BMB after they have been dispatched (in D1 pipeline stage for a previous branch instruction). Accordingly, after instruction B is read from the BMB (row 19, column 10), it may proceed to the decode stage D2 of the pipeline (row 14, column 11).

While instruction B is being retrieved from the BMB, the processor may continue to process instruction A and the instructions succeeding A, i.e., A+1, A+2, . . . under the assumption that the branch prediction is correct. If the branch prediction is correct then instruction B retrieved from the BMB is not used. Predicted instructions A, A+1, A+2, . . . are typically processed at least until the branch condition is known.

While instruction Branch A,B completes the E1 pipeline stage (row 1, column 10), the branch condition may be known and therefore, the actual branch direction is known. The condition result, in this case, indicates that the predicted branch instruction A is wrong and therefore the process should proceed with instruction B instead. As a result, in the decode stage D2 of the next cycle (row 5, column 11), the processor replaces the input of instruction A with the correct branch instruction B from the BMB (row 14, column 11).

In the following two cycles, instructions B+1 and B+2 are read from the BMB (row 19, columns 11 and 12) and are used to replace instructions A+1 and A+2, respectively, in the decoding stage (row 14, columns 12 and 13). Instructions A, A+1, A+2 are replaced by B, B+1, B+2, respectively, in each sequential decode stage D2 (row 5, column 11), (row 6, column 12), and (row 7, column 13), indicated by D2->D2. Since the predicted instruction A (from program memory) and the non-predicted instruction B (from BMB) are both available and dispatched in the same computational cycle (corresponding to column 10), replacing predicted instruction A with non-predicted instruction B in a branch mis-prediction occurs without any computational penalty or time delay for the mis-prediction.

In FIG. 3, the operations occur when, similarly to FIG. 2, a branch predictor mis-predicts that the branch instruction Branch A,B will branch to instruction A instead of the correct instruction B. However, in contrast to FIG. 2, the correct branch instruction B is not stored in the BMB. In this scenario, instruction B may be added to the BMB, and in this way, the BMB may be filled with instructions for use during subsequent mis-predictions.

Branch mechanism may determine that instruction Branch A,B is a branch instruction in operation D2 (row 1, column 7). A branch predictor predicts the branch to proceed to instruction A at address 201. Accordingly, instruction A may enter the processor pipeline, e.g., in pipeline stage IF1 (row 5, column 8) and may be fetched from program memory in the next pipeline stage IF2 (row 5, column 9).

While instruction A is fetched from program memory (row 5, column 8), the BMB may be simultaneously searched for non-predicted instruction B at address 301, e.g., by checking for a BMB cache tag matching the instruction B cache tag (row 17, column 8). In this scenario, in contrast with FIG. 2, address 301 (where instruction B resides) is not found in the cache tag, and the tag compare may assert a miss flag (row 18, column 8). In one embodiment, the cache tag may be implemented in registers (e.g., not RAM) causing the miss flag to be available in the same computational cycle (corresponding to column 8). Since there is a miss in the cache (row 18, column 8), the BMB typically does not access the tag or the BMB data, e.g., to keep power dissipation at a minimum.

The processor may continue to fetch and dispatch instruction A and the instructions succeeding A, i.e., A+1, A+2, . . . under the assumption that the branch prediction is correct. If the branch prediction is correct, then the BMB cache miss (row 16, column 8) is inconsequential and there is no computational penalty for the cache miss.

When instruction Branch A,B completes the E1 pipeline stage (row 1, column 10), the branch condition may be known and therefore, the actual branch direction may be known. The condition result, in this case, may indicate that the predicted branch instruction A is wrong and therefore the process may "kill" instruction A and the instructions succeeding A, i.e., A+1, A+2, . . . (column 10, rows 5, 6, and 7, respectively) before they are decoded in the D2 decoding stage.

As a result, the input of the decode stage D2 should be the correct branch instruction B from the BMB. However, since instruction B was not found in the BMB, there is no input for the decode stage D2 until instruction B is obtained, e.g., for 3 computational cycles (row 16, columns 8, 9, and 10).

The processor may fetch the instruction B from program memory (row 8, column 11). Address 301 of instruction B may be written as a tag in the BMB (row 17, column 13) in preparation for instructions B, B+1, B+2 to be stored in the BMB (row 19, columns , 14, 15, respectively).

Each of instructions B, B+1, B+2 may be fetched (rows 8, 9, 10, respectively, columns 12, 13, 14, respectively) and dispatched. The dispatched instruction packets B, B+1, B+2 may be written to the BMB at a BMB address (row 20, columns 13, 14, 15, respectively), e.g., placed in the BMB based on, for example, a least recently used (LRU) replacement policy. The same dispatched instruction packets B, B+1, B+2 may simultaneously enter the dispatch pipeline stage D1 (rows 8, 9, 10, respectively, columns 13, 14, 15, respectively). In the following computational cycle, the processor may decode the dispatched instruction packets B, B+1, B+2 in the D2 stage (rows 8, 9, 10, respectively, columns 14, 15, 16, respectively).

Accordingly, during a branch mis-prediction, the branch instructions that were not predicted may be stored in the BMB, e.g., if they have not already been stored. In this way, the processor may fill the BMB with correct branch instructions, which were erroneously not predicted. Once stored in the BMB, these branch instructions may be used during future branch mis-predictions, as described in reference to FIG. 2.

Since the correct branch instruction B was not retrieved from program memory (i.e., only the incorrect predicted instruction A was retrieved) nor was the instruction available in the BMB (it was never the branch in a previous mis-prediction), the processor may retrieve instruction B from program memory sub-system (row 8, columns 11, 12, and 13). Retrieving instruction B from program memory sub-system may use additional, e.g., three, computational cycles and thus, the program process may incur a mis-prediction penalty.

In embodiments described above, the dispatched instructions A and B may be available in the same cycle, e.g., in FIG. 2, (row 5, column 10) and (row 19, column 10), respectively, simultaneously ready to be decoded depending on the outcome of the conditional branch instruction Branch A,B. However, in an alternative embodiment, instructions A and B may be dispatched in different cycles or may be processed depending on mis-predict history, penalties, or other criteria.

Although in the embodiments described above, processor 1 stores instructions in the BMB after they have been dispatched (in D1 pipeline stage), in an alternate embodiment, processor 1 may store instructions at any other or additional stage of a pipeline process.

In the embodiments above, during a branch mis-prediction, the BMB stores the correct un-predicted branch instruction. Alternatively, or additionally, during a correct branch prediction, the BMB or a separate memory unit may store the correct predicted branch instruction.

Furthermore, the BMB or a separate memory unit may store statistical data corresponding to each instruction entry in the BMB. The statistical data may include, for example, usage history data such as the computational cycle in which the instruction is used (e.g., for ordering the instructions based on which instruction was least or most recently used), the rate or number of times the instruction was mis-predicted (e.g., for determining whether or not to store the instruction in the BMB or for ordering the instructions in the BMB based on a total or average usage of the instruction), the size of the instruction (e.g., for ordering the instructions based on the size of the instruction), etc.

In one embodiment of the invention, BMB 17 may store mis-predictions for branches that have a mis-prediction rate that is greater than a predetermined threshold. The threshold may be automatically predetermined to satisfy computational efficiency parameters of a computing platform, e.g., based on the success or usage history of instructions stored in BMB 17 for each branch or process versus the memory and computational costs of storing instructions in BMB 17. Alternatively, the predetermined threshold may be manually or semi-automatically set by a programmer e.g., to be greater than 30-50%. If the mis-prediction rate is sufficiently small or less than a predetermined threshold for a specific branch or process, the processor may not store mis-predicted instructions for that branch or process. For example, if an average reduction in the branch mis-prediction penalty for the branch or process is, e.g., less than a specified number of cycles, mis-predicted instructions may not be stored in BMB 17.

In one embodiment of the invention, branch mechanism 14 may predict instructions partially or completely based on which instructions supplement the instructions already stored in BMB 17 instead of instructions that are statistically most likely to occur. For example, branch mechanism 14 may search BMB 17, look for any of the potential unknown branch instructions stored and if any is already stored in BMB 17, the branch prediction unit may predict, or be statistically more likely to predict, the instruction not stored in BMB 17. In this way, processor 1 will retrieve instructions from program memory 3 such that the instructions are new or not redundant to those already stored in BMB 17.

When a program is initiated and there have been no mis-predictions, BMB 17 may be empty. As a program is run, for each (or alternatively, for only some) branch mis-predictions, the mis-predicted instruction may be added to fill BMB 17. BMB 17 may have a fixed or maximum size, e.g., determined by a programmer, or a variable size, e.g., determined automatically based on BMB 17 usage history. The smaller the size of BMB 17, the more efficient its usage. However, the larger the size of BMB 17, the greater the number of instructions that may be stored.

During a mis-prediction, conventional processors fetch the correct mis-predicted instructions from a program memory. The processors then store the instructions in a program cache where they are queued and dispatched. In order to access the instructions, the processor accesses a tag array, performs a tag compare, and accesses the program cache to read the instructions. This process consumes a relatively large amount of processor power. In particular, for example, when large data packets are used, such as "very long instruction word" (VLIW) packets, a VLIW processor retrieves and stored the VLIW packets in a queue or buffers the packets so that they may be issued. After being issued, the VLIW packet are dispatched to the execution units, and only after being dispatched may they be decoded and executed. In conventional systems, this extensive series of operations is executed each and every time there is a branch mis-prediction. According to embodiments of the invention, even when there is a branch mis-prediction, if the correct instruction was previously mis-predicted, the correct instruction is already stored in BMB 17. Therefore, the correct instruction may be quickly retrieved from BMB 17 and the aforementioned extensive series of operations may be eliminated, e.g., wholly or at least partially.

FIG. 4 includes four figures, FIGS. 4A, 4B, 4C and 4D, which are to be viewed together and arranged in four quadrants, FIG. 4A in the upper right quadrant, FIG. 4B in the lower right quadrant, FIG. 4C in the upper left quadrant, and FIG. 4D in the lower left quadrant.

FIGS. 4A, 4B, 4C and 4D show processor operations initiated by a loop instruction according to embodiments of the invention. A loop instruction (e.g., brloop_write) (row 1, column 1) is a special type of branch instruction in which one of the possible branch paths is to repeat a previous instruction, thereby causing a loop or sequence of repeating instructions. In this embodiment, the branch loop instruction is conditional although an unconditional branch loop instruction may also be used.

Embodiments of the invention include a system and method for using BMB 17 as a loop buffer. BMB 17 may be dedicated to storing loop instructions so that they may be accessed locally rather than from program memory 3. Since loop instructions may be used more often than other non-repeating instructions that are not part of a loop sequence, storing the loop instructions locally in BMB 17 rather than in program memory 3 may reduce power consumption used to access program memory 3 and queue and align/dispatch the instructions more so than for other non-repeating instructions.

The branch loop instruction, "brloop_write," (row 1, column 1) indicates the number, n, of instruction packets (e.g., n=6) in an instruction loop. The instruction "nop" indicates no-operation due to latency in the processor pipeline. Processor 1 may use instructions (e.g., chip_select and write_enable instructions) to write the first, n−1, instruction packets of the instruction loop to BMB 17. BMB 17 may include a dedicated register (e.g., brloop_last_ir_r) to which the last, $n^{th}$, instruction packet in the loop is written. While the last instruction packet in the loop is being written to the dedicated register, it is know that there are no more instructions in the loop, and the first instruction packet in the loop may be automatically and simultaneously retrieved from BMB 17.

To write instructions to BMB 17, when the number-of-packets is decoded (row 1, column 6), processor 1 may update one or more registers in BMB 17 to allow that number (e.g., n=6) of instruction packets to be written to respective entries of BMB 17 (row 30, columns 7-12). Using the tag address instruction (row 27), the BMB 17 tag array may be updated, while the BMB 17 cache array may be updated using the cache index instruction (row 30). Each BMB 17 entry may hold one or more (e.g., four) instruction packets. For example, the first BMB 17 entry may be filled with the first four instruction packets in the loop A1-A4 (row 30, columns 7-10). A corresponding tag address may be written to BMB 17 (row 27, column 7) for each BMB 17 entry. If the instruction loop includes more than four instructions, then processor 1 may update BMB 17 registers to find the next BMB 17 entry to be filled with the next (up to) four instruction packets A5 (row 30, column 11), and accordingly write the corresponding tag address (row 28, column 11). Processor 1 continues this process until all but the last instruction A6 is written to BMB 17 (row 30, column 11). Processor 1 may perform a tag compare for every fourth instruction to find the address of the next BMB 17 entry (row column 12) to retrieve instructions from BMB 17 (row 31, columns 13, 14, . . . ).

In some embodiments of the invention, instructions are written to BMB 17 in an order based on a least recently used (LRU) algorithm. BMB 17 may include registers and corresponding entries that are ordered based on a LRU algorithm.

The branch loop (brloop) instruction A4 (row 6, column 1) (with two delay slots A5 and A6—rows 7 and 8, column 1) may be predicted taken or not-taken The predicted-taken address 102 may be written to a "not predicted branch target address" or "PTADDR_R" register (row 43, column 12) and used to search the tag array of BMB 17 (row 26, column 12). When the branch loop instruction A4 is taken, loop instructions may be accessed from BMB 17 instead of from program memory 3 to reduce power consumption. The not-taken address 108 is typically only used at the end of the last loop iteration or on an exit condition where the branch is predicted incorrectly. The last loop of the iteration (row 25, column 26) may be where there is an exit condition or where branch is predicted incorrectly.

Interrupt unit 13 may interrupt a current process (not shown), e.g., to initiate another process, often damaging partially processed branch instruction data. Interrupt unit 13 may be disabled while processor 1 writes loop instructions to BMB 17. Interrupt unit 13 may also be disabled while processor 1 reads instructions from BMB 17. In one exception, interrupts may be allowed while reading the last instruction packet, e.g., in each iteration of an instruction loop. If such an interruption is accepted then, if a branch instruction is taken then the return register may be written with the program address in the PTADDR_R register (row 43, columns 12, 18, 24), and if the branch is not-taken then the return register may be written with the program address from the program counter or "pseq_pc". BMB 17 may be locked, to allow a programmer to control replacement of BMB 17 entries.

The status of the loop buffer may be tracked by indicators, flags, or other markers. A "buf_valid" flag may be set when all of the instructions in the loop are written and/or available in BMB 17. The buf_valid flag may be cleared when any of the loop instructions are replaced in BMB 17. A "buf_active" flag may be set when processor 1 accesses instructions from BMB 17. The buf_active flag may be set after encountering a brloop_write instruction and loop instructions are written to BMB 17. The buf_active flag may be cleared when a branch is taken or when a call or interruption is encountered.

The status of the loop buffer may be indicated by different flag combinations. For example, buf_valid and buf_active may indicate each of the following four different states:

When buf_valid is cleared and buf_active is cleared then the program counter may access instructions outside of the range of BMB 17. In this situation the instructions may be fetched from program memory 3.

When buf_valid is cleared and buf_active is set then the instructions may be fetched from program memory 3 and written to BMB 17.

When buf_valid is set and buf_active is set then the instructions may be fetched directly from BMB 17.

The buf_valid is set and buf_active is cleared when an interrupt or a taken branch has caused the program counter to jump to program addresses outside of the range of BMB 17. In this situation the instructions are fetched from program memory 3. On return from the sub-routine or interruption, buf_active may be set (or alternatively, buf_active may only be set once a brloop_write instruction is encountered).

FIGS. 4A, 4B, 4C and 4D show an example of a process having a loop with six instruction packets A1-A6 (rows 3-8, column 1). In this example, branch instruction of the loop (brloop_write) is conditional. However, it will be appreciated by those skilled in the art that embodiments of the invention similarly apply to branch loop instructions that are unconditional, i.e., always taken.

FIGS. 4A, 4B, 4C and 4D show a process of writing to BMB 17 (row 30), reading from BMB 17 during the iterations of the loop (row 31), and exiting from the loop (either due to the loop counter being negative or due to the branch condition being false). The loop exit may be seen in row 25, column 26 where the decoder input is operating on "next instruction" (NI) at address 108, which is not a loop instruction and in row 29, column 26, where BMB 17 is no longer being accessed for loop instructions.

During the first iteration of the loop, the instructions are executed and simultaneously written to BMB 17. During subsequent iterations the instructions are accessed from BMB 17, while program memory 3, queue, and dispatcher are idle. At the end of the last iteration, program memory 3, queue, and dispatcher begin operating on the next sequentially instruction packet that comes after the loop, e.g., address 108, 109, 110, . . . BMB 17 may include a buffer, cache or other memory structure that stores mis-predicted or loop instructions in a separate cache for access during subsequent mis-predictions or iterations of the loop. BMB 17 typically does not rely on the history of branch outcomes to make future predictions, thereby overcoming the limitations of both static and dynamic branch prediction techniques. In alternate embodiments, BMB 17 may wholly or partially take into account branch prediction histories to make future predictions.

BMB 17 typically does not rely on software directives. However, in some embodiments, software directives may be used to pre-load instructions into BMB 17. BMB 17 may be fully or partially transparent to a programmer BMB 17 may use a fully or partially associative cache to store instructions at the branch target address. These instructions may be automatically retrieved during an instruction loop or when a branch predictor predicts incorrectly (e.g., achieving zero overhead during branch mis-predictions).

Figure 5:
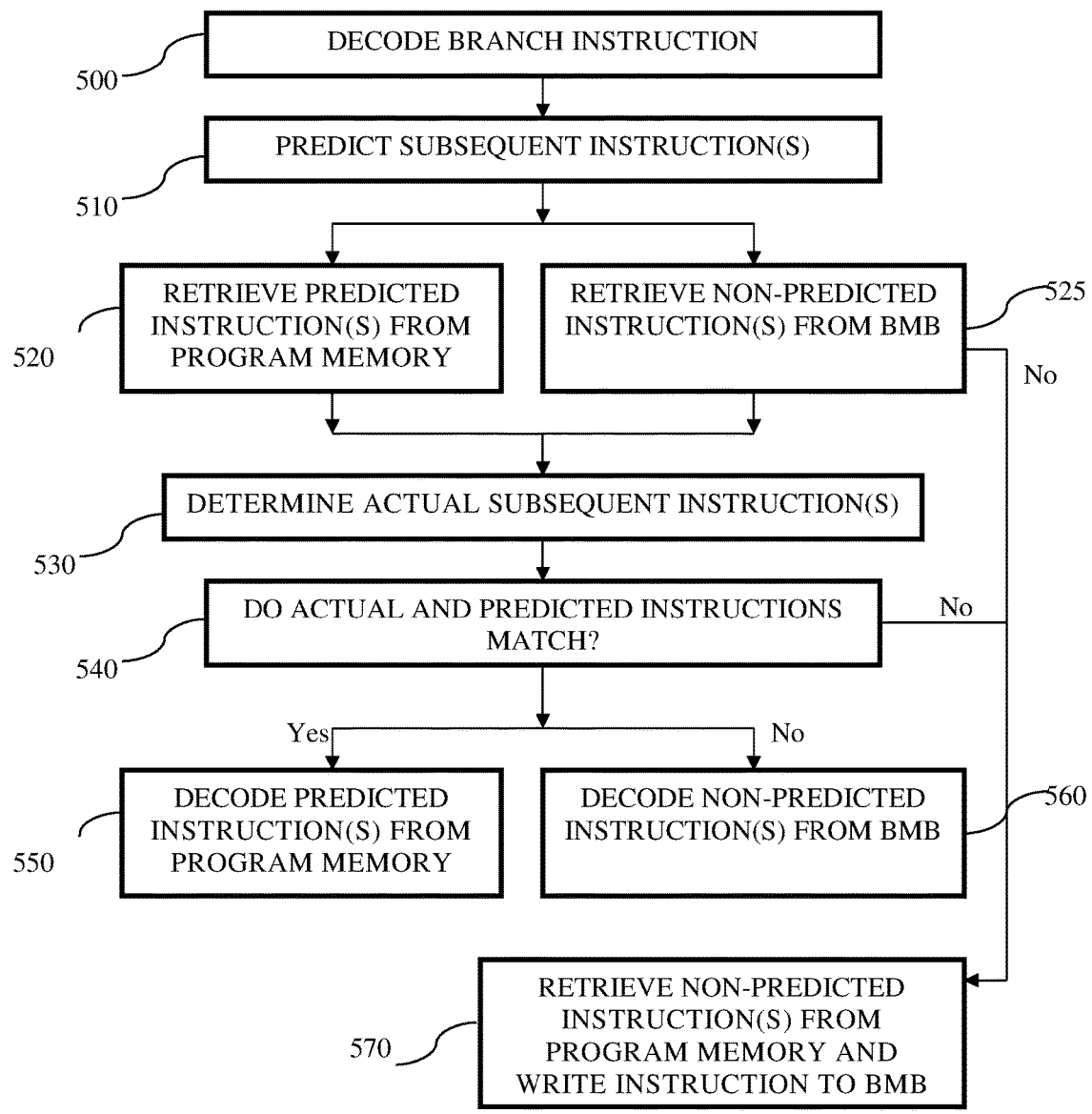
FIG. 5 is a flowchart of a method in accordance with embodiments of the invention.

Reference is made to FIG. 5, which is a flowchart of a method according to embodiments of the invention.

In operation 500, a processor may decode a conditional branch instruction.

In operation 510, a branch prediction unit may predict the subsequent instruction(s) following the branch.

In operation 520, a fetching unit may retrieve the predicted instruction(s) from program memory.

In operation 525, the processor may retrieve a non-predicted instruction from the branch mis-prediction buffer (BMB), e.g., by checking for a BMB cache tag matching the instruction cache tag. Operations 520 and 525 may be run substantially simultaneously, e.g., in the same clock cycle.

In operation 530, the processor may execute the branch instructions and determine the actual subsequent instruction(s) following the branch.

In operation 540, the processor may compare the actual subsequent instruction(s) following the branch with the predicted instruction(s) retrieved from program memory. If the actual instruction(s) match the predicted instruction(s), a process may proceed to operation 550. If the actual instruction(s) do not match the predicted instruction(s), a process may proceed to operation 560.

In operation 550, the processor may decode the predicted instruction(s) retrieved from program memory.

In operation 560, the processor may decode the non-predicted instruction(s) retrieved from the BMB.

If the non-predicted instruction was not found in the BMB and therefore, not retrieved in the BMB in operation 525, and the actual instruction(s) determined in operation 530 do not match the predicted instruction(s) retrieved from program memory in operation 520, a process may proceed to operation 570.

In operation 570, the processor may retrieve the non-predicted instructions from program memory, decode the instructions and write the instruction to the BMB.

Other operations or series of operations may be used.

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:
1. A system for executing conditional branch instructions, the system comprising:
a branch mis-prediction buffer;
a processor to execute sequential pipeline stages of instructions;
a branch predictor to predict one or more predicted instructions that depend on a conditional branch instruction during execution of the sequential pipeline stages;
a program memory; and
a fetch unit to retrieve the one or more predicted instructions from the program memory during execution of the sequential pipeline stages;
wherein the processor is further to:
during execution of the sequential pipeline stages, search the branch mis-prediction buffer for decoded non-predicted instructions that were not predicted by the branch predictor and if the decoded non-predicted instructions are found in the branch mis-prediction buffer, retrieve the decoded non-predicted instructions from the branch mis-prediction buffer simultaneously with retrieval of the one or more predicted instructions from the program memory;
determine actual branch direction of the branch instruction;
if the one or more predicted instructions are correct, decode the one or more predicted instructions; and
if the one or more predicted instructions are not correct and the decoded non-predicted instructions are found in the branch mis-prediction buffer, execute the decoded non-predicted instructions retrieved from the branch mis-prediction buffer;
wherein, if the one or more predicted instructions are not correct and the decoded non-predicted instructions are not found in the branch mis-prediction buffer:

the fetch unit to retrieve one or more non-predicted instructions from the program memory, the processor to dispatch and decode the one or more non-predicted instructions, and the branch mis-prediction buffer to store the one or more decoded non-predicted instructions retrieved from the program memory for use in subsequent conditional branch instructions.

2. The system of claim 1, wherein the branch mis-prediction buffer stores instructions using a least recently used (LRU) algorithm.

3. The system of claim 1, wherein the branch mis-prediction buffer stores all instructions of a loop.

4. The system of claim 1, comprising:
a branch mechanism to determine that an instruction is a conditional branch instruction.

5. The system of claim 1, wherein the one or more predicted instructions retrieved from the program memory and the decoded non-predicted instructions retrieved from the branch mis-prediction buffer are both available to the processor in a same computational cycle.

6. The system of claim 1, wherein the one or more predicted instructions may be any one of multiple different instructions.

7. A method for executing a conditional branch instruction, the branch instruction is associated with one or more predicted instructions that are predicted to follow the conditional branch instruction and one or more non-predicted instructions, the method comprising:

retrieving the one or more predicted instructions from a program memory;

retrieving the one or more decoded non-predicted instructions from a branch mis-prediction buffer that stores previously used decoded non-predicted instructions that were not predicted during a previous branch mis-prediction, wherein retrieving the one or more decoded non-predicted instructions from the branch mis-prediction buffer is being performed simultaneously with retrieving the one or more predicted instructions from the program memory; and if a current branch mis-prediction occurs, executing the decoded non-predicted instructions retrieved from the branch mis-prediction buffer.

8. The method of claim 7, further comprising:
retrieving one or more new non-predicted instructions from the program memory when another branch mis-prediction occurs and the one or more non-predicted instructions are not stored in the branch mis-prediction buffer.

9. The method of claim 8, further comprising dispatching, decoding and storing the one or more new non-predicted instructions retrieved from the program memory in the branch mis-prediction buffer.

10. The method of claim 7, wherein the one or more non-predicted instructions are executed after the conditional branch instruction is executed.

11. The method of claim 7, wherein the branch mis-prediction buffer stores instructions using a least recently used (LRU) algorithm.

12. The method of claim 7, comprising storing all instructions of a loop in the branch mis-prediction buffer and retrieving the loop instructions from the branch mis-prediction buffer when the branch instruction is a loop instruction.

13. A method for storing instructions in a branch mis-prediction buffer, the method comprising:

retrieving from a program memory one or more first predicted instructions that depend on a conditional branch instruction;

determining that a current branch mis-prediction has occurred and that the first one or more predicted instructions are incorrect;

retrieving a correct one or more non-predicted instructions from the program memory;

temporarily storing the correct one or more non-predicted instructions in a program cache for use in the current branch mis-prediction;

decoding the correct one or more non-predicted instructions from the program cache following the conditional branch instruction;

storing the decoded correct one or more non-predicted instructions in the branch mis-prediction buffer for use in subsequent branch mis-predictions; and in a subsequent branch mis-prediction:

retrieving from the program memory one or more predicted instructions that depend on a subsequent conditional branch instruction; and retrieving one or more decoded non-predicted instructions associated with the subsequent conditional branch instruction and stored in the branch mis-prediction buffer simultaneously with retrieving from the program memory the one or more predicted instructions that depend on the subsequent conditional branch instruction;

determining actual branch direction of the subsequent conditional branch instruction;

if the one or more predicted instructions are correct, decoding the one or more predicted instructions; and if the one or more predicted instructions are not correct and the decoded non-predicted instructions associated with the subsequent conditional branch instruction are found in the branch mis-prediction buffer, executing the decoded non-predicted instructions associated with the subsequent conditional branch instruction retrieved from the branch mis-prediction buffer.

14. The method of claim 13, comprising storing all instructions of a loop in the branch mis-prediction buffer and retrieving the loop instructions when the loop is taken.

15. The method of claim 13, wherein the branch mis-prediction buffer stores instructions using a least recently used (LRU) algorithm.

16. The method of claim 13, wherein the one or more second predicted instructions retrieved from the program memory and the decoded non-predicted instructions retrieved from the branch mis-prediction buffer are both available to a processor in a same computational cycle.

* * * * *